US010938173B2

(12) United States Patent
Blake et al.

(10) Patent No.: US 10,938,173 B2
(45) Date of Patent: Mar. 2, 2021

(54) RESISTANCE WELDING COPPER TERMINALS THROUGH MYLAR

(71) Applicant: Caliente LLC, Fort Wayne, IN (US)

(72) Inventors: James T. Blake, Wolcottville, IN (US); Tyler W. Ambriole, Fort Wayne, IN (US); Samuel N. Gray, Fort Wayne, IN (US)

(73) Assignee: Caliente LLC, Fort Wayne, IN (US)

( * ) Notice: Subject to any disclaimer, the term of this patent is extended or adjusted under 35 U.S.C. 154(b) by 0 days.

(21) Appl. No.: 16/582,003

(22) Filed: Sep. 25, 2019

(65) Prior Publication Data

US 2020/0099188 A1 Mar. 26, 2020

Related U.S. Application Data

(60) Provisional application No. 62/736,141, filed on Sep. 25, 2018.

(51) Int. Cl.
*B23K 11/18* (2006.01)
*H05B 3/03* (2006.01)
*H01R 43/02* (2006.01)
*H01R 4/02* (2006.01)
*H01R 4/18* (2006.01)
*B23K 11/00* (2006.01)
*B23K 11/16* (2006.01)
*H01R 12/51* (2011.01)

(52) U.S. Cl.
CPC ........ *H01R 43/0214* (2013.01); *B23K 11/002* (2013.01); *B23K 11/163* (2013.01); *B23K 11/18* (2013.01); *H01R 4/029* (2013.01); *H01R 4/185* (2013.01); *H01R 12/515* (2013.01); *H05B 3/03* (2013.01)

(58) Field of Classification Search
CPC .... H01R 43/0214; H01R 4/029; H01R 4/185; H01R 12/515; B23K 11/002; B23K 11/163; B23K 11/18; H05B 3/03
USPC ...................................... 174/70 R
See application file for complete search history.

(56) References Cited

U.S. PATENT DOCUMENTS 2,899,658 A 8/1959 Bean, Jr.
3,272,960 A * 9/1966 Smith .................. B23K 11/163
219/56.21

(Continued)

FOREIGN PATENT DOCUMENTS

JP 2005-322568 A 11/2005
WO 2018/034488 A1 2/2018

OTHER PUBLICATIONS

Notification of Transmittal of the International Search Report and the Written Opinion of the International Searching Authority, or the Declaration dated Jan. 10, 2020 for International Application No. PCT/US2019/052830 (14 pages).

*Primary Examiner* — Timothy J Thompson
*Assistant Examiner* — Michael F McAllister
(74) *Attorney, Agent, or Firm* — Taylor IP, P.C.

(57) ABSTRACT

A method for fusing an electrical conductor to a film pad circuit including the steps of: providing an electrically inert substrate having a first surface and an opposing second surface; applying an electrically conductive film to the second surface of the electrically inert substrate; applying an electrically conductive member to the electrically conductive film; placing an electrical conductor on the first surface of the electrically inert substrate; and fusing the electrical conductor to the conductive member.

18 Claims, 4 Drawing Sheets

(56) References Cited

U.S. PATENT DOCUMENTS

| | | | |
|---|---|---|---|
| 3,623,906 A * | 11/1971 | Akeyoshi et al. | C03C 17/06 |
| | | | 219/203 |
| 4,201,218 A | 5/1980 | Feldman et al. | |
| 4,306,217 A * | 12/1981 | Solow | H01C 7/06 |
| | | | 29/613 |
| 4,830,876 A * | 5/1989 | Dietrich | B32B 17/10036 |
| | | | 427/108 |
| 5,103,071 A | 4/1992 | Henschen et al. | |
| 5,432,322 A | 7/1995 | Ingram et al. | |
| 5,528,222 A | 6/1996 | Moskowitz et al. | |
| 6,039,238 A | 3/2000 | Panaghe | |
| 6,281,449 B1 * | 8/2001 | Nakamura | H05K 3/341 |
| | | | 174/261 |
| 6,323,426 B1 * | 11/2001 | Hoshizaki | H01L 39/04 |
| | | | 174/125.1 |
| 6,817,088 B1 * | 11/2004 | Lin | B29C 45/1782 |
| | | | 29/611 |
| 7,323,665 B2 | 1/2008 | Sperry et al. | |
| 8,076,612 B2 | 12/2011 | Wölfel | |
| 8,816,255 B2 | 8/2014 | Lee et al. | |
| 10,342,073 B2 * | 7/2019 | Schoen | B29D 23/005 |
| 2010/0170616 A1 | 7/2010 | Boss et al. | |
| 2010/0315401 A1 * | 12/2010 | Su | B23K 26/0006 |
| | | | 345/211 |
| 2017/0294724 A1 * | 10/2017 | Henschel | H01R 43/0256 |
| 2020/0053873 A1 * | 2/2020 | Schaetzle | H01M 10/615 |

* cited by examiner

RESISTANCE WELDING COPPER TERMINALS THROUGH MYLAR

CROSS REFERENCE TO RELATED APPLICATIONS

This is a non-provisional application based upon U.S. provisional patent application Ser. No. 62/736,141, entitled "RESISTANCE WELDING COPPER TERMINALS THROUGH MYLAR", filed Sep. 25, 2018, which is incorporated herein by reference.

BACKGROUND OF THE INVENTION

1. Field of the Invention

The present invention relates to electrical resistance welding, and, more particularly, to the resistance welding of copper terminals through a layer of mylar.

2. Description of the Related Art

Resistant welding generally refers to welding processes such as spot and seam welding that produce a coalescence of surfaces where the heat generated to form the weld is generated by the electrical resistance of the material being welded along with the time and the force used to hold the materials together during the welding process. Some factors that influence the required welding temperatures are the proportions of the workpieces, whether there is metal coating, the electrode materials, electrode geometry, electrode pressing force, as well as electrical current directed to the weld and length of welding time.

One such welding process includes the welding of wires to a thick film pad that is part of a circuit, such as a heater circuit. The welding process establishes an electrical connection between the wires and a thick film pad. Currently when stranded wires are used, the wires may be any of several different wire gauges. This means that a unique weld profile must be developed for each wire size. Additionally, when parts that have rigid leads are welded directly to a thick film pad the welds can sometimes break if the lead is flexed in certain ways. Sometimes the weld tips, by which the pulses are discharged from the welder into the part being welded, will roll off the wire. This results in a bad weld which will have to be reworked or the part scrapped.

What is needed in the art is reliable, economical way of coupling a wire to a film circuit.

SUMMARY OF THE INVENTION

The present invention provides a method of forming a circuit by welding conductors through an electrically inert material.

The invention in one form is directed to a method for fusing an electrical conductor to a film pad circuit including the steps of: providing an electrically inert substrate having a first surface and an opposing second surface; applying an electrically conductive film to the second surface of the electrically inert substrate; applying an electrically conductive member to the electrically conductive film; placing an electrical conductor on the first surface of the electrically inert substrate; and fusing the electrical conductor to the conductive member.

The invention in another form is directed to an electrical circuit including an electrically inert substrate, an electrically conductive film, an electrically conductive member and an electrical conductor. The electrically inert substrate has a first surface and an opposing second surface. The electrically conductive film is applied to the second surface of the electrically inert substrate. The electrically conductive member is applied to the electrically conductive film. The electrical conductor is positioned on the first surface of the electrically inert substrate, and the electrical conductor is fused through the electrically inert substrate to the conductive member.

An advantage of the present invention is that a reliable electrical connection is established through an inert substrate.

Another advantage is that the circuit formed provides a terminal to which various wire sizes can be coupled.

BRIEF DESCRIPTION OF THE DRAWINGS

The above-mentioned and other features and advantages of this invention, and the manner of attaining them, will become more apparent and the invention will be better understood by reference to the following description of embodiments of the invention taken in conjunction with the accompanying drawings, wherein.

Corresponding reference characters indicate corresponding parts throughout the several views. The exemplifications set out herein illustrate embodiments of the invention and such exemplifications are not to be construed as limiting the scope of the invention in any manner.

DETAILED DESCRIPTION OF THE INVENTION

Figure 1:
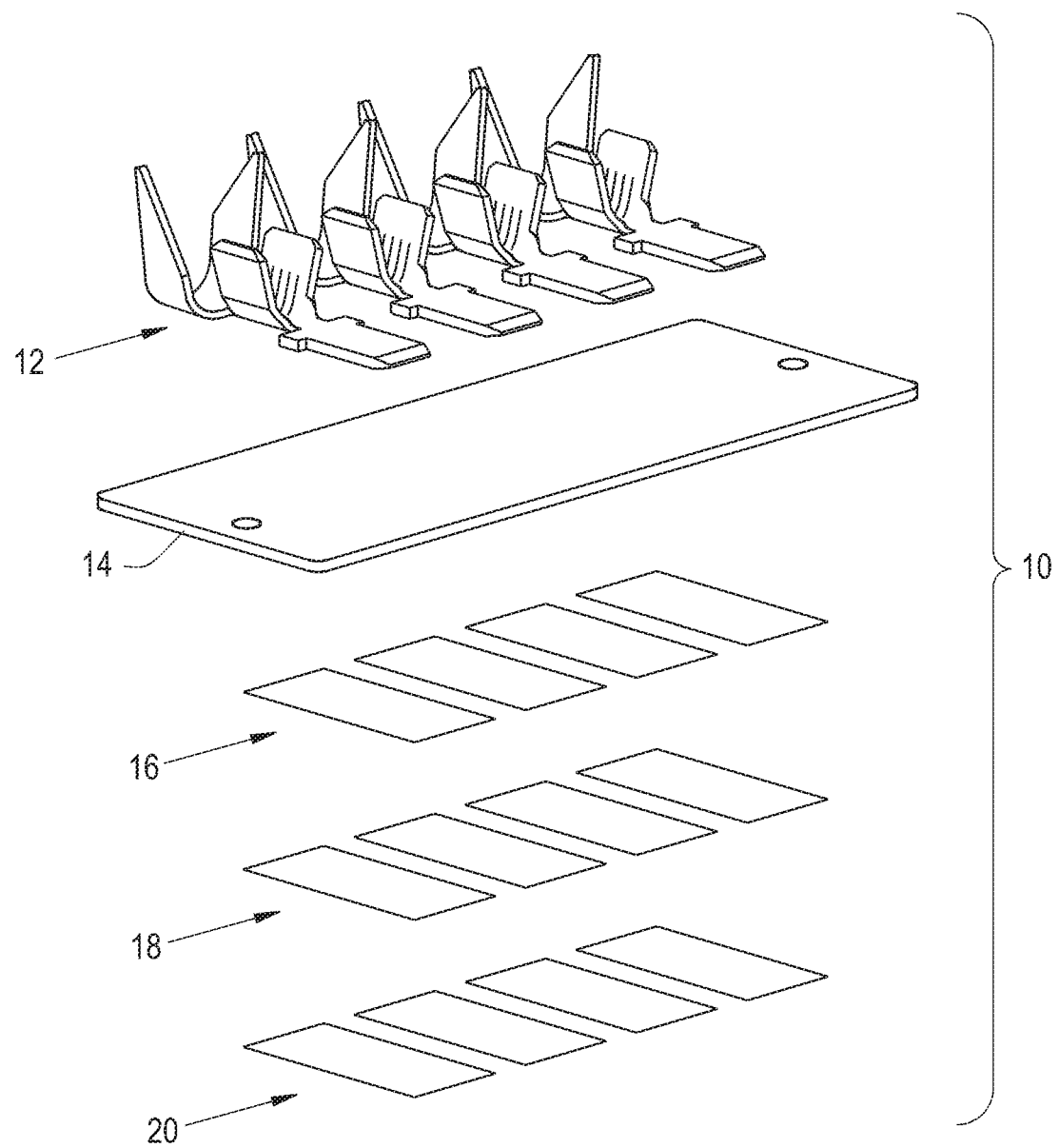
FIG. 1 is an exploded perspective view of a series of four terminals that will be assembled using an embodiment of a welding method of the present invention that welds the terminals to a conductive pad.
Figure 2:
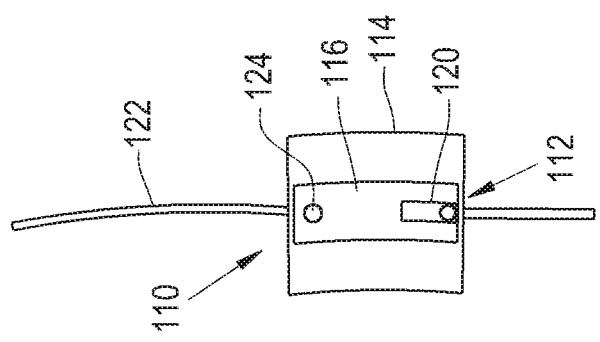
FIG. 2 illustrates a mylar layer upon which a conductive ink has been screen printed.
Figure 3:
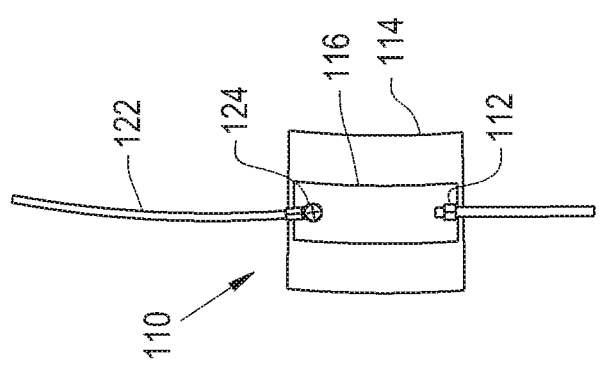
FIG. 3 illustrates a conductive tape placed on the conductive ink of FIG. 2.
Figure 4:
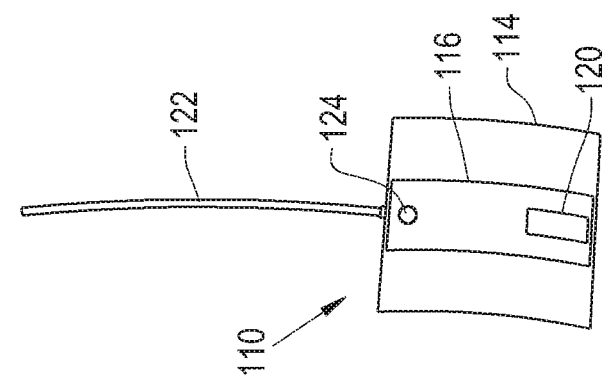
FIG. 4 illustrates a welded terminal on the mylar layer side of the assembly of FIGS. 2 and 3, with a wire attached.
Figure 5:
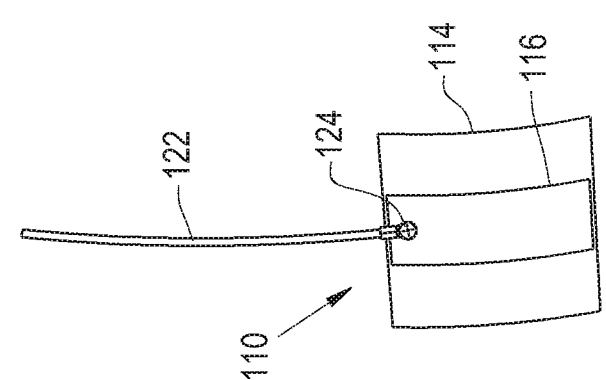
FIG. 5 illustrates the ink side of the mylar layer (same side as illustrated in FIG. 3) showing the weld on the conductive tape.

Referring now to the drawings, and more particularly to FIG. 1, there is shown, an exploded perspective view of elements that form an electrical transitional assembly 10 which generally includes electrical conductors 12 in the form of terminals 12, a layer of an electrically inert substrate 14, electrically conductive films 16, electrically conductive adhesive 18, and electrically conductive tape 20. The electrically conductive films 16 are applied to electrically inert substrate 14 by a method such as screen printing of a conductive ink. To the electrically conductive films 16 the electrically conductive tape 20, which has the electrically conductive adhesive 18 on one side of tape 20, is applied to films 16. Electrically inert substrate 14 may be in the form of a sheet of mylar 14. Tape 20 and adhesive 18 may be integrally formed before application to film 16. It is also contemplated that adhesive 18 and tape 20 are applied to film 16 individually. It is further contemplated that tape 20, can be an electrically conductive member 20 used in the inventive method of the present invention, with or without adhesive 18. Conductive member 20 is welded to terminal 12 in the course of carrying out the steps claimed herein.

Terminals 12 are in the form of crimpable weld terminals 12. Using a terminal 12 that can be crimped to many different wire gauges of wire allow for multiple gauges to be used, including TCO leads, while always presenting the welder with a consistent material to weld, accounting for the success of the present inventive method. This means that a single weld profile can be utilized for all parts that use a particular weld terminal 12. While the lead attached thereto is rigid, the weld terminal 12 has more surface area than a wire to bond with the circuit, such as a heater circuit, making the weld more robust. Since terminal 12 presents a flat surface, the issue of weld tips rolling off of a wire are completely mitigated. An additional benefit to moving to a crimped welded terminal 12 is that the process becomes much easier to automate.

Welders used in the inventive process can be, for example, one manufactured by Sunstone Engineering as their model CD1000. This model is a capacitive discharge welder, which means that there is a large capacitor bank which is charged to a specific voltage. The charge is then discharged, in a controlled way, through the pieces being welded. This discharge creates a great deal of heat causing the materials being welded to melt together forming a weld. While one type of welder is discussed above, it is more broadly referred to as a microwelding device. Currently the different types of microwelders available include Capacitive Discharge welders, Direct Energy welders, High Frequency Inverter welders, and Linear DC welders.

The voltage that the capacitors are charged to perform the welding of the present inventive method is determined by a Total Energy (TE) setting. A foot pedal is used to lower the head of the welder on top of terminal 12, then a second foot pedal is pressed triggering the energy to be discharged. The timing and duration of this discharge depends on Pulse 1 (P1) and Pulse 2 (P2) settings. The pulse settings are typically thought of as percentages of TE. P1 may be set between 0-100 watt-seconds (ws) or Joules (J). P2 may be set between 0-1000 ws. Total Energy may be set between 0-1000 ws. The sum of P1 and P2 may not exceed the setting for TE. In the present inventive method Pulse 1 is in the range of 70-200 J and Pulse 2 is in the range of 100-900 J, with the Total Energy being generally in the range of 700-1000 J.

For our process, there may be a total of 5 layers. Please refer to FIG. 1 for an exploded view of the material stackup, which are shown in a somewhat schematic manner without showing further circuit paths that would exist on substrate 14. The materials being fused are the tinned copper weld terminal 12 and the tinned copper tape 20. Because of this, the weld must go through Mylar 14, conductive ink 16, and conductive adhesive 18 in order to fuse the two materials 12 and 20. This also means that the welding tips of the welder that deliver the electric pulse, must both be on the same side this is referred to a series weld and is essential in order to generate enough heat to melt the layers between weld terminal 12 and copper tape 20.

Some Considerations of Weld Parameters:

Tinned vs. Untinned Copper—Whether or not the copper is tinned (either the tape or the terminal), can yield differing results.

Surface Cleanliness—Any tarnish between the surfaces will increase contact resistance and therefore influence the current flow through the weld process.

Weld Schedule—The number of pulses being used as well as their duration of both the pulses and time between them.

Energy and Time—The welder delivers electrical pulses. The magnitude and duration of these pulses are determined by three Parameters. Pulse 1 (P1), Pulse 2 (P2), and Total Energy (TE).

Now, additionally referring to FIGS. 2-5 there are shown steps taken in preparing Test Specimens to be used in evaluation of the inventive procedure. Similar items will have their associated reference number offset by a factor of 100 in the various discussion herein, with each property of one being carried over to the other item that is offset by some multiple of 100 being added to the two digit base reference number. Each weld coupon 110 includes a Mylar square 114 approximately 2.25"×2.25" with a layer of silver ink 116 approximately 0.75" wide running through it. On the ink side 116 of the coupon 110, a 0.25" wide piece of copper tape 120 was placed toward the edge of each coupon 110. This tape 120 was placed approximately centered on the X axis on the silver trace 116. A 16 AWG wire 122 was attached via a ring terminal 124 with an eyelet driven through it on the opposite end of the coupon 110. Also, approximately centered on the silver trace 116, coupon 110 has a copper strip 112 welded to it from the Mylar side, to copper tape 120.

Voltage Drop and Tensile Strength Tests were performed on multiple samples 110. The Tensile strength test being destructive and yields the peak force required to separate the copper terminal from the coupon by pulling on wire 122 and copper strip 112.

In order to ensure a consistent, repeatable weld it was found that it was best to utilize both P1 and P2, rather than just try to perform the weld in one pulse. Pulse 1 melts through all of the layers between the weld terminal 12, 112 and copper tape 20, 120. P2 is utilized to perform the weld itself between terminal 12, 112 and copper tape 20, 120. API setting of approximately 175 ws allowed for complete melt through of all layers between the weld terminal 12, 112 and copper tape 20, 120.

After determining that full melt through of all layers between the materials to be welded was achieved, the remaining schedule testing was done in conjunction with Energy and Time testing as they are all intertwined. Testing also showed that a P2 setting of 725 ws was optimal.

Optimal Terminal thickness and size was determined that the thinner the strip, the shorter the strip and the narrower the strip, the easier it was to weld. This meant that we were limited by the welding tips and how thin of a material that crimped wire terminals can be made from. This turned out to be 0.020" thick and around 0.157" by 0.250" in the welding area. FIGS. 7-9B illustrate terminals used.

Resistance welding through a layer of Mylar 14 is possible but great care must be taken in order to ensure repeatable, consistent results. There is a very narrow window in which the two materials will fuse together using the inventive method.

It is contemplated that other types of welders can be used to perform the steps of the present invention. The timing and energy delivery in the two pulse of energy being used to first melt through Mylar 14 and the second pulse being primarily used to weld the terminal 12 to the conductive tape 20.

It is also contemplated that various forms of tape 20 may be utilized in the inventive process. For example an embossed copper tape 20 may be used, where the conductive properties of the adhesive and not critical and the ridges of the tape 20 may make physical contact with conductive film 16.

Figure 6:
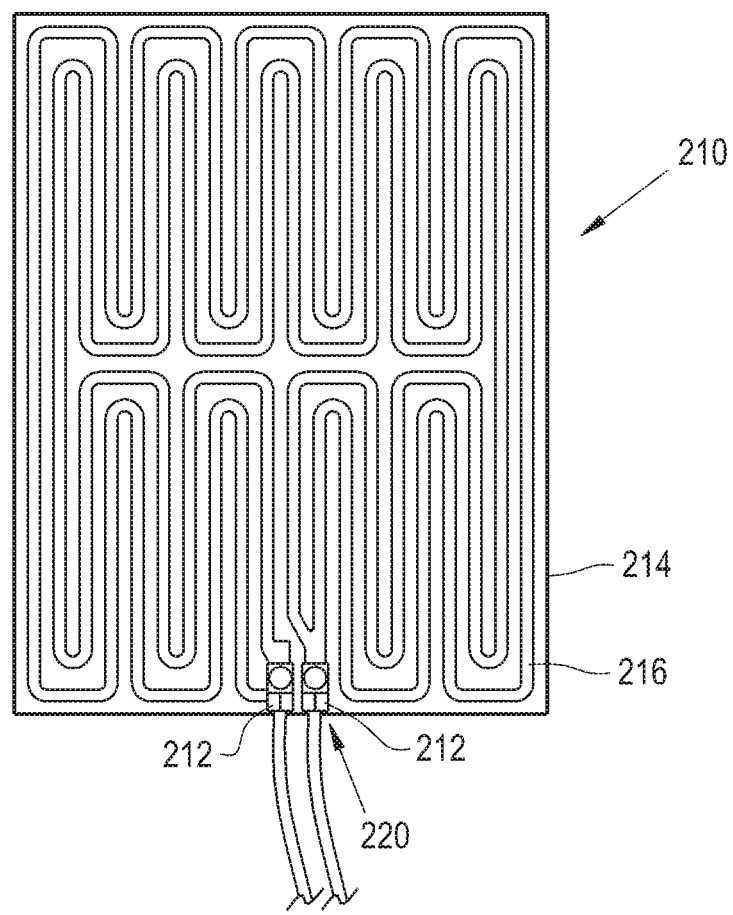
FIG. 6 illustrates a circuit, in the form of a heating circuit having two terminals welded thereto using the method of the present invention, with wires attached to the terminals.

Now, additionally referring to FIG. 6, there is illustrated a circuit 210 having a conductive path 216 on electrically inert substrate 214, having terminals 212 welded through substrate 214 to a conductive tape 220. Circuit 210 may be in the form of a heater circuit 210, or could be a sensor or a combination of a circuit, such as a heater and a sensor, such as a temperature sensor printed on substrate 214.

Figure 7:
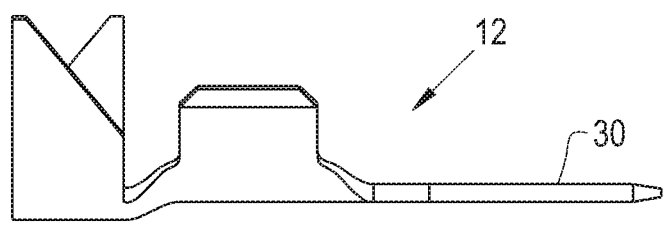
FIG. 7 is a side view of a terminal used in the welding method of the present invention.
Figure 8:
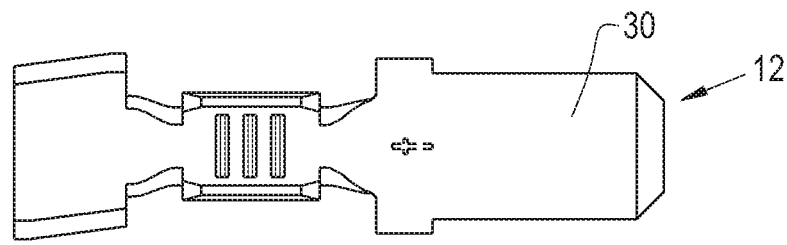
FIG. 8 is a top view of the terminal of FIG. 7.

Now, additionally referring to FIGS. 7-9B there are shown two types of terminals 12. FIGS. 7 and 8 depict a first type of terminal 12 having a flat welding area 30, upon which the welding tip is placed and the heat created therein melts through the intervening layers so that when the second pulse of energy is delivered welding area 30 is welded to conductive tape 20. A conductive path is then established through terminal 12 to conductive tape 20 then to film 16.

Figure 9A:
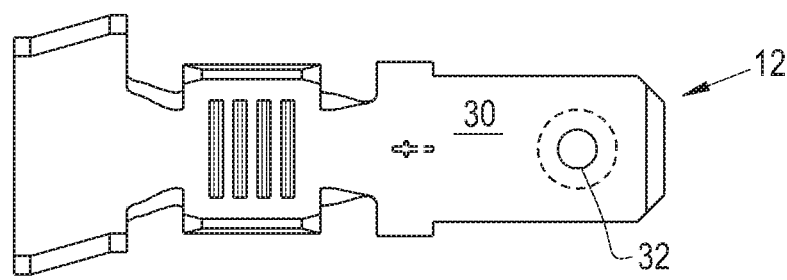
FIG. 9A is a top view of another terminal used in the welding method of the present invention.
Figure 9B:
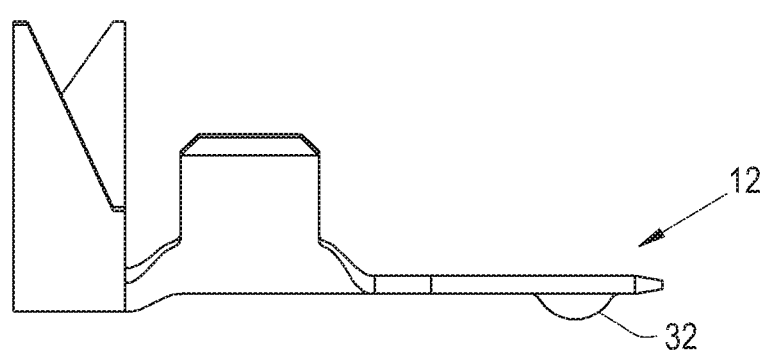
FIG. 9B is a side view of the terminal of FIG. 9A.

FIGS. 9A and 9B depict a second type of terminal 12 having a generally flat welding area 30, with a protrusion 32 extending down toward the intervening layers so that when the second pulse of energy is delivered welding area 30, primarily in the area of protrusion 32 is located, is welded to conductive tape 20. A conductive path is then established through terminal 12 to conductive tape 20 then to film 16.

While this invention has been described with respect to at least one embodiment, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

What is claimed is:

1. A method for fusing an electrical conductor to a film pad circuit, comprising the steps of:
   providing an electrically inert substrate having a first surface and an opposing second surface;
   applying an electrically conductive film to the second surface of the electrically inert substrate;
   applying an electrically conductive member to the electrically conductive film;
   placing an electrical conductor on the first surface of the electrically inert substrate; and
   fusing the electrical conductor to the conductive member, wherein a first side of the conductive member includes an electrically conductive adhesive, the electrically conductive adhesive being on a side of the conductive member being applied to the electrically conductive film.

2. The method of claim 1, wherein the fusing of the electrical conductor is a welding process carried out using a microwelder.

3. A method for fusing an electrical conductor to a film pad circuit, comprising the steps of:
   providing an electrically inert substrate having a first surface and an opposing second surface;
   applying an electrically conductive film to the second surface of the electrically inert substrate;
   applying an electrically conductive member to the electrically conductive film;
   placing an electrical conductor on the first surface of the electrically inert substrate; and
   fusing the electrical conductor to the conductive member, the conductive member is an electrically conductive tape.

4. The method of claim 1, wherein the fusing of the electrical conductor to the conductive member has a first pulse that melts the electrically inert substrate, and a second pulse that fuses the electrical conductor, the electrically conductive film, the electrically conductive adhesive and the conductive member together.

5. The method of claim 4, wherein the first pulse uses from 70 J to 200 J of energy and the second pulse uses from 100 J to 900 J of energy.

6. A method for fusing an electrical conductor to a film pad circuit, comprising the steps of:
   providing an electrically inert substrate having a first surface and an opposing second surface;
   applying an electrically conductive film to the second surface of the electrically inert substrate;
   applying an electrically conductive member to the electrically conductive film;
   placing an electrical conductor on the first surface of the electrically inert substrate; and
   fusing the electrical conductor to the conductive member, the electrically inert substrate is a mylar film.

7. The method of claim 1, wherein the electrical conductor is a terminal.

8. A method for fusing an electrical conductor to a film pad circuit, comprising the steps of:
   providing an electrically inert substrate having a first surface and an opposing second surface;
   applying an electrically conductive film to the second surface of the electrically inert substrate;
   applying an electrically conductive member to the electrically conductive film;
   placing an electrical conductor on the first surface of the electrically inert substrate; and
   fusing the electrical conductor to the conductive member, the electrical conductor being a terminal, the terminal includes a projection that extends toward the electrically inert substrate when the terminal is placed on the first surface of the electrically inert substrate.

9. The method of claim 8, wherein the fusing step fuses the terminal to the electrically conductive film and the electrically conductive member primarily proximate to the protrusion.

10. The method of claim 1, wherein the film pad circuit is a film pad heater.

11. An electrical circuit, comprising:
    an electrically inert substrate having a first surface and an opposing second surface;
    an electrically conductive film applied to the second surface of the electrically inert substrate;
    an electrically conductive member applied to the electrically conductive film;
    an electrical conductor positioned on the first surface of the electrically inert substrate, the electrical conductor being fused through the electrically inert substrate to the conductive member, wherein a first side of the conductive member includes an electrically conductive adhesive, the electrically conductive adhesive being on the first side of the conductive member that is applied to the electrically conductive film.

12. The electrical circuit of claim 11, wherein the fusing of the electrical conductor to the electrically conductive member takes place with two energy pulses, the first pulse generating heat melt through the inert substrate, the second pulse being of greater energy than the first pulse, the second pulse causing a welding of the electrical conductor to the conductive member.

13. The electrical circuit of claim 11, wherein the fusing of the electrical conductor to the conductive member uses less than approximately 1000 J of energy.

14. The electrical circuit of claim 11, wherein the fusing of the electrical conductor to the conductive member has a first pulse that melts the electrically inert substrate, and a second pulse that fuses the electrical conductor, the electrically conductive film, the electrically conductive adhesive and the conductive member together.

15. The electrical circuit of claim 14, wherein the first pulse uses from 70 J to 200 J of energy and the second pulse uses from 100 J to 900 J of energy.

16. An electrical circuit, comprising:
an electrically inert substrate having a first surface and an opposing second surface;
an electrically conductive film applied to the second surface of the electrically inert substrate;
an electrically conductive member applied to the electrically conductive film;
an electrical conductor positioned on the first surface of the electrically inert substrate, the electrical conductor being fused through the electrically inert substrate to the conductive member, the electrically inert substrate is a mylar film.

17. The electrical circuit of claim 11, wherein the electrical conductor is a terminal.

18. An electrical circuit, comprising:
an electrically inert substrate having a first surface and an opposing second surface;
an electrically conductive film applied to the second surface of the electrically inert substrate;
an electrically conductive member applied to the electrically conductive film;
an electrical conductor positioned on the first surface of the electrically inert substrate, the electrical conductor being fused through the electrically inert substrate to the conductive member, the electrical conductor being a terminal, the terminal includes a projection that extends toward the electrically inert substrate when the terminal is placed on the first surface of the electrically inert substrate.

* * * * *